US011003760B2

United States Patent
Machani (10) Patent No.: US 11,003,760 B2
(45) Date of Patent: May 11, 2021

(54) USER ACCOUNT RECOVERY TECHNIQUES USING SECRET SHARING SCHEME WITH TRUSTED REFEREE

(71) Applicant: RSA Security LLC, Bedford, MA (US)

(72) Inventor: Salah E. Machani, Medford, MA (US)

(73) Assignee: RSA Security LLC, Bedford, MA (US)

( * ) Notice: Subject to any disclaimer, the term of this patent is extended or adjusted under 35 U.S.C. 154(b) by 317 days.

(21) Appl. No.: 16/262,191

(22) Filed: Jan. 30, 2019

(65) Prior Publication Data

US 2020/0242232 A1 Jul. 30, 2020

(51) Int. Cl.
  *G06F 21/45* (2013.01)
  *H04L 29/06* (2006.01)
(52) U.S. Cl.
  CPC .......... *G06F 21/45* (2013.01); *H04L 63/0861* (2013.01); *H04L 63/0884* (2013.01); *G06F 2221/2115* (2013.01); *G06F 2221/2131* (2013.01); *G06F 2221/2133* (2013.01); *G06F 2221/2137* (2013.01)
(58) Field of Classification Search
  CPC ............. G06F 21/45; G06F 2221/2115; G06F 2221/2133; G06F 2221/2137; G06F 2221/2131; H04L 63/0884; H04L 63/0861; H04L 29/06
  See application file for complete search history.

(56) References Cited

U.S. PATENT DOCUMENTS

| 10,116,648 | B1 | 10/2018 | Sharma |
| 2013/0061298 | A1* | 3/2013 | Longobardi ............ G06F 21/42 726/6 |
| 2014/0053251 | A1 | 2/2014 | Chen et al. |
| 2014/0324722 | A1 | 10/2014 | Schechter et al. |
| 2016/0140335 | A1 | 5/2016 | Proulx et al. |
| 2016/0149886 | A1 | 5/2016 | Korokithakis et al. |
| 2016/0239657 | A1 | 8/2016 | Loughlin-McHugh et al. |
| 2016/0359863 | A1 | 12/2016 | Krstic et al. |
| 2017/0070510 | A1 | 3/2017 | Ramalingam et al. |
| 2017/0142080 | A1* | 5/2017 | Hill ........................ H04L 63/08 |
| 2017/0163615 | A1 | 6/2017 | Ho et al. |
| 2017/0195315 | A1 | 7/2017 | Rubinstein et al. |
| 2017/0250972 | A1 | 8/2017 | Ronda et al. |
| 2017/0255769 | A1 | 9/2017 | Loughlin-McHugh et al. |
| 2018/0089419 | A1 | 3/2018 | Loughlin-McHugh et al. |

OTHER PUBLICATIONS

R. Witty et al., "Automated Password Reset Can Cut IT Service Desk Costs," https://gartner.com/doc/464518/automated-password-reset-cut-it, Dec. 13, 2004, 2 pages.

(Continued)

*Primary Examiner* — Quazi Farooqui
(74) *Attorney, Agent, or Firm* — Danielson Legal LLC (57) ABSTRACT

Account recovery control systems and methods are provided to support a self-service account recovery process for registered users of an information system. Account recovery protocols implement a secret sharing scheme between trusted referees and registered users of the information system to enable a registered user to regain access to the user's registered account when one or more authentication factors of the registered user are lost (e.g., forgotten, misplaced, damaged, stolen, etc.).

20 Claims, 6 Drawing Sheets

(56) References Cited

OTHER PUBLICATIONS

T. Phillips et al., "Market Guide for Identity Proofing and Corroboration," Apr. 24, 2018, 2 pages.
P. Rabinovich et al., "Cloud-Based MFA is Ready for Prime Time," https://gartner.com/doc/3833763/cloudbased-mfa-prime-time, Nov. 28, 2017, 1 page.
RSA Labs, "Advanced Research and Development Focused Squarely on Solving the World's Most Pressing Cybersecurity Challenges," https://rsa.com/en-us/research-and-thought-leadership/rsa-labs, Nov. 28, 2017, 5 pages.
S. Chakraborty et al., "An Overview of Face Liveness Detection," International Journal on Information Theory (IJIT), Apr. 2014, pp. 11-25, vol. 3, No. 2.
RSA, "Authenticating with an RSA SecurID Token," RSA ACE/Server 6.0 Authentication Instructions, downloaded Jan. 28, 2019, 3 pages.

\* cited by examiner

USER ACCOUNT RECOVERY TECHNIQUES USING SECRET SHARING SCHEME WITH TRUSTED REFEREE

FIELD

The field relates generally to techniques for user authentication and, in particular, techniques for account recovery of user accounts to access-controlled resources.

BACKGROUND

As information systems continue to become increasingly essential to business and commerce, the implementation of effective security measures becomes increasingly important to prevent or mitigate security threats posed by cyber security breaches and unauthorized access to such information systems by hackers and trespassers looking to sabotage the information systems or steal confidential data. A generally approach to dealing with fraudulent activity has been to employ identity-based authentication systems to verify the identity of users before granting access to an information system and access-controlled resources of the information system. An authentication system verifies user identities by applying authentication methods that require a user to present one or more authentication factors (or alternatively, authenticators) before granting the user access to the information system. The authentication factors include, for example, something a user knows (e.g., password), something a user possesses (e.g., one-time passcode token, security token), or something a user is (e.g., biometric).

Occasionally, one or more authentication factors of a given user may be lost (e.g., forgotten, misplaced, damaged, stolen, etc.) requiring the user to request assistance from an IT service department which administers and manages a given information system to replace the lost authenticator(s). For example, a user may have forgotten his/her password and calls an IT help desk to initiate a password reset. Given that labor costs associated with IT help desks and call centers can be significant, self-service systems such as automated password reset solutions have been implemented to reduce the IT service desk labor costs. Most automated password reset solutions rely on one or more methods for password reset, such as: (i) static knowledge base security questions; (ii) SMS one-time codes provided by a text message service (e.g., short message service (SMS); and (iii) e-mail links. However, such methods have been proven weak and subject to attacks, as such methods have been deemed (according to NIST-800-63 digital identity guidelines) to not meet Level 1 authentication assurance and, therefore, will not be adequate for user to restore access to accounts that are protected using Level 2 or Level 3 assurance authenticators, such as multi-factor cryptographic authenticators.

SUMMARY

Embodiments of the invention include account recovery control methods (e.g., self-service account recovery) which are implemented using a secret sharing scheme between trusted referees and registered users of an information system to enable the registered users to regain access to their registered accounts when the registered users loses one or more authentication factors that are needed for access to the information system.

For example, one embodiment includes an account recovery process which is performed by an authentication server in response to receiving notification from a first registered user of a loss of at least one authentication factor which is utilized by the first registered user to access an information system, wherein the authentication server is configured to control access to the information system by a plurality of registered users of the information system. The account recovery process includes the authentication server performing a verification process to verify an identity of the first registered user, prompting the first registered user to select a second registered user of the information system as a trusted referee to assist in the account recovery process, notifying the selected trusted referee of the account recovery process, and providing identifying information of the first registered user to the selected trusted referee. In response to the authentication server receiving a confirmation of the identity of the first registered user from the selected trusted referee, the authentication server generates an original recovery access code comprising at least a first component and a second component, and sends the second component of the original recovery access code to the selected trusted referee. The authentication server will receive from the first registered user, the first and second components of the original recovery access code, and reconstruct a recovery access code using the first and second components received from the first registered user. In response to the reconstructed recovery access code matching the original recovery access code, the authentication server generates and sends a recovery token to the first registered user for use in recovering a registered account of the first registered user for access to the information system.

Other embodiments of the invention include, without limitation, computing systems and articles of manufacture comprising processor-readable storage media to provide account recovery control methods which are implemented using a secret sharing scheme with trusted referees.

DETAILED DESCRIPTION

Figure 1:
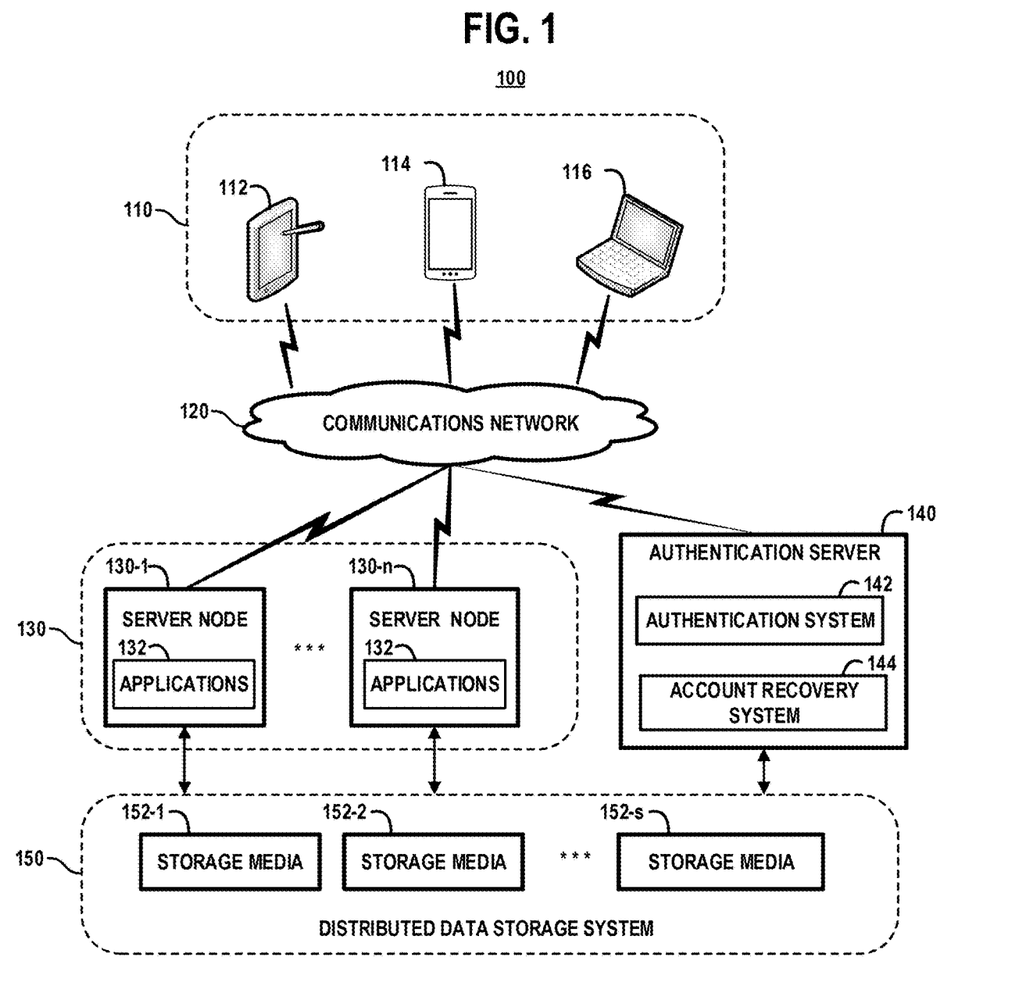
FIG. 1 schematically illustrates an information system comprising an authentication system that is configured to implement an account recovery control process, according to an embodiment of the invention.

Embodiments of the invention will be described herein with regard to account recovery control systems and methods (e.g., self-service account recovery) which are implemented using a secret sharing scheme between trusted referees and registered users of an information system to enable the registered users to regain access to their registered accounts when the registered users lose one or more authentication factors that are needed for access to the information system. For example, FIG. 1 schematically illustrates an information system 100 comprising an authentication system that is configured to provide account recovery according to an embodiment of the invention. The information system 100 comprises user computing devices 110, a communications network 120, a server cluster 130, an authentication server 140, and a data storage system 150.

The user computing devices device 110 include, e.g., electronic tablets 112, smart phones 114, laptop computers 116, and other types of computing devices such as desktop computers, personal digital assistants, etc., that enable users, tenants, customers, and other entities to access and utilize data and/or services supported by the information system 100. The server cluster 130 comprises a plurality of application server nodes 130-1, ..., 130-n, which host one or more applications 132 that are executed across the server cluster 130. The authentication server 140 comprises an authentication system 142 and an account recovery system 144, the functions of which will be explained in further detail below. The distributed data storage system 150 comprises plurality of storage media devices 152-1, 152-2, ..., 152-s (collectively referred to as storage media devices 152), which collectively provide a pool of storage resources that are shared by the application server nodes 130-1, ..., 130-n and the authentication server 140.

The communications network 120 provides network connections between the computing devices 110, the application server nodes 130-1, ..., 130-n, and the authentication server 140. The communications network 120 comprises, for example, a global computer network such as the Internet, a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the communications network 120 (in some embodiments) comprises combinations of multiple different types of communications networks each comprising network devices configured to communicate using an Internet Protocol (IP) (e.g., TCP/IP) or other communication protocols. The communications network 120 comprises various components such as routers, switches, gateways, bridges, etc., and other elements that form a network backbone to establish communication paths and enable communication between the computing devices 110, the application server nodes 130-1, ..., 130-n, and the authentication server 140.

The storage media devices 152-1, 152-2, ..., 152-s comprise persistent storage elements to store data, as well as control circuitry that is configured to control data access operations for storing or accessing data to and from one or more persistent storage elements of the storage media devices 152-1, 152-2, ..., 152-s. The persistent storage elements can be implemented using one or more different types of persistent storage devices such as HDDs (hard disk drives), flash storage devices (e.g., PCIe flash cards), SSD (solid state drive) devices, or other types and combinations of non-volatile memory. In some embodiments, the storage media devices 152-1, 152-2, ..., 152-s are configured as a networked-based storage system to provide a centralized repository for data that can be stored and accessed by the application server nodes 130-1, ..., 130-n and the authentication server 140. In one embodiment, the storage media devices 152-1, 152-2, ..., 152-s can be configured in a storage area network (SAN) (e.g., as a virtual SAN implemented using a software-defined storage system such as ScaleIO™) and coupled to the cluster of server nodes 130 and authentication server 140 using (i) a dedicated switch fabric which is separate from the communications network 120 or (ii) a Converged Ethernet (CE) network which is implemented as part of the communications network 120 to integrate a server and storage network on a same LAN.

The information system 100 may comprise one or more data centers, a cloud computing platform, or any other type of information processing networks, or combinations of computer networks and computing platforms. While FIG. 1 depicts a high-level schematic illustration of the information system 100 for ease of discussion, the information system 100 could include a complex IT infrastructure comprising any combination of logical and physical elements, including, but not limited to, application servers, web servers, storage servers, databases, hardware, software, storage system, and/or networking resources, which are utilized to implement one or more types of information systems for one or more target applications. For example, the information system 100 may comprise any one of various types of information systems including, e.g., operations support systems (e.g., transaction processing system), management information systems, decisions support systems, executive information systems, etc., and other types of information networks that allow shared access to system resources and information (e.g., computers, servers, databases, files, programs, etc.) by a plurality of registered users of the information system.

The authentication server 140 implements methods for authenticating any entity (e.g., user or remote server) that attempts to access the information system 100 (e.g., access the server cluster). The authentication server 140 maintains usernames and corresponding authentication factors (e.g., passwords) of registered users of the information system 100, and executes authentication applications that support user authentication and security token access using various types of authentication tokens. In addition, the authentication server 140 implements access control methods to control access to system resourced based on information such as predefined user permissions and company policies that are maintained in databases or directories.

The authentication system 142 of the authentication server 140 implements an authentication process that is configured to control access to resources and services of the information system 100 by verifying the identity of registered users before granting access to the information system 100. The authentication system 142 can implement one or more of various types of known single factor authentication (SFA) systems or multi-factor authentication (MFA) systems. An SFA system implements an authentication process for securing access to the information system 100 by verifying a registered user's identity using a single authentication factor. On the other hand, a MFA system implements an authentication process for securing access to the information system 100 by verifying a registered user's identity using a two or more authentication factors. An authentication factor (alternatively, authenticator) comprises evidence that verifies a user's claimed identity in the form of: (i) knowledge factors (something only the user would know); (ii) possession factors (something only the user possesses), (iii) inherence factors (something the user is); location-based factors (where the user is located), etc.

In particular, knowledge factors are a commonly used form of user authentication in which a user is required to prove knowledge of some secret known to the user in order to authenticate, e.g., a password (word or string of characters), a passphrase (multiple words), a personal identification number (PIN), answers to secret questions, a transaction authentication number (TAN), etc. A possession factor comprises a physical object in the possession of the user which is used to authenticate, e.g., a USB stick with a secret token, a bank card, a security key, an authentication token, etc. A possession factor can be a disconnected token or a connected token. A disconnected token does not physically or wirelessly connect to a computing device. The RSA SecurID® token is an example of a disconnected token generator. A disconnected token typically has a built-in screen to display generated authentication data, which is manually typed by the user. Connected tokens are devices that are physically connected to a computing device (e.g., computer) and transmit data automatically, e.g., card readers, wireless tags, USB tokens, etc.

An inherence factor comprises a physical characteristic of the user (e.g. biometric data) which is used to authenticate a user through biometric authentication, e.g., face recognition, voice recognition, fingerprint recognition, iris recognition, etc. In addition, inherence factors include behavioral biometrics such keystroke dynamics (e.g., typing speed, pattern in key press intervals, etc.). Location based factors consider the physical location of the user for purposes of user authentication, e.g., connection to a specific computing network or utilizing a global positioning system (GPS) signal to identify the user's location, etc. For example, while hard wired to a corporate network, a user could be allowed to login to the network using only a PIN, or if the user is remotely accessing the network, authentication may require entering an access code generated by a soft token in addition to using the PIN. As another example, network admission control (e.g., level of network access by a user) can be contingent on the specific network to which the user device is connected, e.g., WI-FI connectivity as compared to wired connectivity.

Other examples of authentication factors include a one-time password (OTP) or code which is (i) generated or received by a devices (e.g. a security token or smartphone) that only the user possesses or (ii) generated by the system and sent to the registered mobile number or email-id, etc. The OTP is typically used to supplement a user-controlled password. In addition, a FIDO authenticator with biometric protection can be utilized to support multi-factor cryptographic authentication.

During operation, a registered user that seeks access to an application or service hosted by the server cluster 130 is required to submit an access request to a server within the server cluster 130 using a user computing device 110. The server will respond by sending the request to the authentication server 140 with directions to perform a user authentication process to authenticate the identity of the registered user and also perform other function such as determining a user's level of access to determine if the user is authorized to access data, services or functions as specified in the access request. The authentication server 140 responds to the server request by utilizing the authentication system 142 to perform an authentication process which comprises prompting the user to provide one or more authentication factors, and comparing the authentication factor(s) received from the user against known valid authentication factors of the registered user which can be obtained from an authentication database. The authentication system 142 compares the received response against the correct response and generates an authentication result. The authentication result is sent to the server and the server will grant or deny the access request of the user based on the authentication result.

The account recovery system 144 of the authentication server 140 implements methods to perform an account recovery process to enable a registered user to regain access to the user's account in the event that the registered user loses one or more authentication factors needed to access the user's account. In the context of the embodiments described herein, the term "lost" or "lose" with regard to an authentication factor is broadly meant to refer to any situation where a user cannot utilize a registered authentication factor, e.g., the authenticator is forgotten, misplaced, damaged, stolen, etc. As explained in further detail below, the account recovery system 144 implements account recovery methods that combine contextual data, a secret sharing scheme, optional biometrics, and a user ID verification technique that relies on a trusted individual (e.g., trusted referee or guarantor) who is pre-assigned (as part of an enrollment process) to verify an identify of the user seeking account recovery before issuing a geo-fenced, time-bound and scope-limited emergency access or recovery token to the user for account recovery.

In the context of the embodiments described herein, the term "trusted referee" broadly refers to an individual within a given organization, e.g., a manager, human resources (HR) representative, an IT administrator in an Enterprise setting, who knows and verifies the identity of another person (e.g., employee) associated with the given organization. In addition, trusted referees are individuals who are registered users of the information system of the given organization and can be authenticated by the authentication server 140. An employee may select one or more trusted referees from a corporate directory or be assigned one or more trusted referees from within their organization automatically by the account recovery system 144. It is assumed that the trusted referee knows the employee well enough to be able to assert their physical and behavioral attributes.

As part of an account recovery process implemented by the account recovery system 144, at least one trusted referee assigned to a registered user receives a first share of a recovery token and the registered user (seeking account recovery) receives a second share of the recovery token. The account recovery system 144 combines the first and second shares of the recovery token received by the registered user to reproduce the recovery token and allow account recovery if the reproduced recovery token matches the original recovery token generated by the account recovery system 144. The recovery token can be utilized by the registered user to (i) obtain temporary access to the user's account or (ii) replace a lost or damaged authentication factor.

In this regard, account recovery protocols according to embodiments of the invention implement a secret sharing scheme in a secure protocol to produce a recovery or emergency access token that allows a registered user to regain access to an account after loss or damage of an authenticator. It is to be understood that in the context of the embodiments discussed herein, the term "account recovery" is broadly defined to include scenarios wherein a recovery token is generated to (i) allow temporary access to the user's account for a pre-determined period of time (which gives the user the ability to access and use the account, and generate new authentication factors in due course before the expiration period) or to (ii) allow access to the account for the purpose of generating new authentication factor(s) and binding the new authentication factors to the registered user account.

Figure 2:
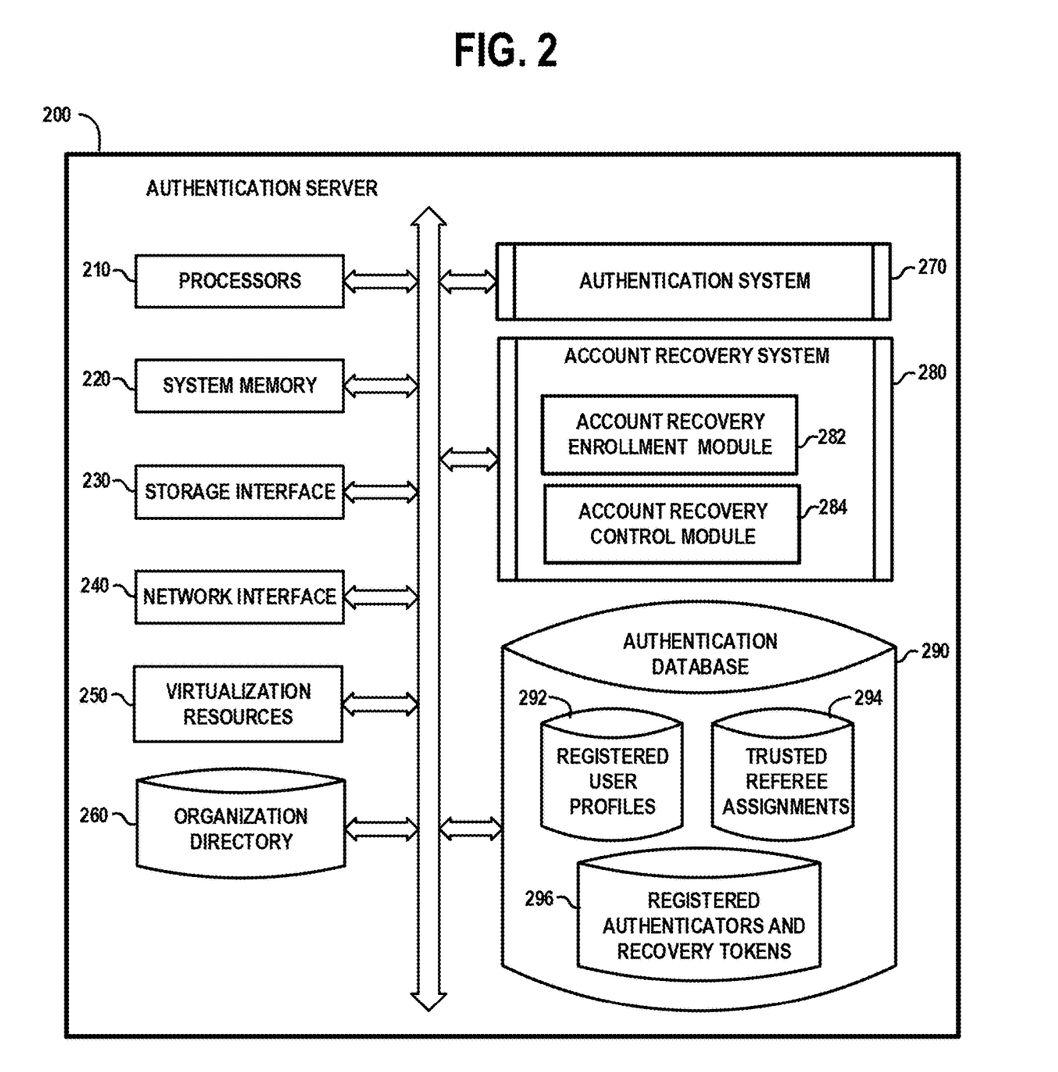
FIG. 2 schematically illustrates an authentication server which is configured to perform an account recovery control process according to an embodiment of the invention.

FIG. 2 schematically illustrates an authentication server 200 which is configured to perform an account recovery control process according to an exemplary embodiment of the invention. For example, FIG. 2 schematically illustrates an exemplary hardware and software architecture of the authentication server 140 of FIG. 1. The authentication server 200 comprises processors 210, system memory 220, a storage interface 230, a network interface 240, virtualization resources 250, an organization directory database 260, an authentication system 270, an account recovery system 280 and an authentication database 290. The account recovery system 280 comprises an account recovery enrollment module 282 and an account recovery control module 284. The authentication database 290 comprises a database of registered user profiles 292, a database of trusted referee assignments 294, and a database of registered authentication factors and recovery tokens of registered users 296.

In particular, the processors 210 comprise one or more types of hardware processors that are configured to process program instructions and data to execute a native operating system and software applications that run on the authentication server 200. For example, the processors 210 may comprise one or more central processing units (CPUs), a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), application-specific integrated circuits (ASICs), field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general-purpose processor.

The system memory 220 comprises various types of memory such as volatile random-access memory (RAM), non-volatile random-access memory (NVRAM), or other types of memory, in any combination. The term "memory" or "system memory" as used herein refers to volatile and/or non-volatile memory which is utilized to store application program instructions that are read and processed by the processors 210 to execute the native operating system and other applications hosted by the authentication server 200, and to temporarily store data that is utilized and/or generated by the native operating system and application programs running on the authentication server 200. For example, the volatile memory may be a dynamic random-access memory (DRAM) (e.g., DRAM DIMM (Dual In-line Memory Module), or other forms of volatile RAM. The system memory may comprise non-volatile memory that is configured and accessible as a memory resource. For example, the non-volatile system memory may be one or more of a NAND Flash storage device, an SSD device, or other types of next generation non-volatile memory (NGNVM) devices.

The storage interface circuitry 230 enables the processors 210 to interface and communicate with the system memory 220, and other local storage and off-infrastructure storage media (e.g., data storage system 150, FIG. 1), using one or more standard communication and/or storage control protocols to read data from or write data to volatile and non-volatile memory/storage devices. Such protocols include, but are not limited to, Non-Volatile Memory Express (NVMe), Peripheral Component Interconnect Express (PCIe), Parallel ATA (PATA), Serial ATA (SATA), Serial Attached SCSI (SAS), Fibre Channel, etc.

The network interface 240 enables the authentication server 200 to interface and communicate with a network and other system components (e.g., a cloud-based data storage system). The network interface circuitry 240 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, direct memory access (DMA) and RDMA data transfer protocols, etc.

The virtualization resources 250 can be instantiated to execute one or more applications or functions which are hosted by the authentication server 200. For example, the virtualization resources 250 can be configured to implement the various modules and functionalities of the authentication system 270 and account recovery system 280 or other applications that execute on the authentication server 200. In one embodiment, the virtualization resources 250 comprise virtual machines that are implemented using a hypervisor platform which executes on the authentication server 200, wherein one or more virtual machines can be instantiated to execute functions of the authentication server 200. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the authentication server 200, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 250 comprise containers such as Docker containers or other types of Linux containers (LXCs). As is known in the art, in a container-based application framework, each application container comprises a separate application and associated dependencies and other components to provide a complete file system, but shares the kernel functions of the host operating system with the other application containers. Each application container executes as an isolated process in user space of the host operating system. In particular, a container system utilizes the underlying host operating system that provides the basic services to all containerized applications using virtual-memory support for isolation. One or more containers can be instantiated to execute one or more applications or functions of the authentication server 200 and the authentication system 270 and account recovery system 280. In yet another embodiment, containers may be used in combination with other virtualization infrastructure such as virtual machines implemented using a hypervisor, wherein Docker containers or other types of LXCs are configured to run on virtual machines in a multi-tenant environment.

The organization directory 260 comprises a corporate directory that is populated with current contact information of individuals who are employees of, or otherwise affiliated with, a given organization and who may utilize or otherwise access the resources of an information system or information network of the given organization. In one exemplary embodiment, it is assumed that all individuals listed in the organization directors 260 are registered users of an information system of the organization and have registered user accounts established with the authentication server 200. The organization directory 260 is generated using, for example, Lightweight Directory Access Protocol (LDAP) or any other suitable client-server protocols for implementing and accessing directory services which allow an organization to manage and store its directory in a centralized location and maintain current contact information for the employees and affiliates of the organization. While the organization directory 260 is depicted as residing in the authentication server 200, the organization directory 260 can be located in another server and accessed by the authentication server 200 to obtain user contact information as needed to implement various functions of the authentication system 270 and account recovery system 280.

In some embodiments, the authentication system 270 and account recovery system 280 (and constituent modules) comprise software that is persistently stored in local storage resources (e.g., data storage system) and loaded into the system memory 220, and executed by the processors 210 to perform respective functions as described herein. In this regard, the system memory 220, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The authentication system 270 implements one or more of various types of known single SFA or MFA systems as discussed above to provide controlled access to resources of an information system or information network of a given organization. The authentication system 270 allows users to register with the authentication server 200 to create registered user accounts and establish one or more authentication factors that are used to enable controlled and secured access to resources of an information system of a given organization. The information regarding registered users is maintained in the database of registered user profiles 292 of the authentication database 290. In addition, the registered user profiles 292 of registered users are mapped to registered authenticators of the users as maintained in the database of registered authenticators and recovery tokens 296.

During an authentication process to verify the identity of a registered user seeking access to resources of the information system or information network of the given organization, the authentication system 270 will verify a user ID of the registered user based on information contained in the registered user profiles 292 (e.g., verify that the user has a registered account for secured access to network resources), and compare authentication factor(s) provided by the user against the registered authentication factor(s) of the user (which are mapped to the registered user profile) to authenticate the identity of user as being a registered user.

The account recovery system 280 implements methods to enable a registered user to regain access to the user's account in the event that the registered user loses (e.g., forgotten, misplaced, damaged, stolen, etc.) one or more authentication factors needed to access the user's account. In particular, the account recovery enrollment module 282 is configured to implement an account recovery enrollment process which allows a registered user (enrollee) to enroll for account recovery services. In an exemplary embodiment, an enrollment process comprises assigning one more individuals to serve as trusted referee for the registered user. In one embodiment, a trusted referred assignment process is performed by the account recovery enrollment module 282 prompting the enrolling user to select one or more individuals from the organization directory 260 to act as a trusted referee for the user. The account recovery enrollment module 282 sends a notification to the user-selected individuals to request their acknowledgment/approval to act as a trusted referee for the user. With this process, each individual selected by the user to serve as a trusted referee has to acknowledge that they know the user and explicitly accept the role as a trusted referee to assist the user during an authenticator recovery process.

In another embodiment, the trusted referee assignment process is performed by the account recovery enrollment module 282 automatically selecting one or more individuals from the organization directory 260 to act as a trusted referee for the user. With the automatic selection process, the account recovery enrollment module 282 can utilize information within the organization directory 260 or other information sources to identify individuals to serve as a trusted referee, who would most likely have personal knowledge of the enrolling user's identity (e.g., physical and/or behavioral attributes of the user). For example, a current manager or assistant manager of the enrolling user or an HR representative who has most likely worked with the enrolling user to assist in the hiring, administration, or training processes of the user, can be automatically selected by the account recovery enrollment module 282 as potential trusted referees. The account recovery enrollment module 282 sends a notification to the system-selected individuals to request their acknowledgment/approval to act as a trusted referee for the user.

In all instances, the individuals who are selected to serve as a trusted referee for the enrolling user will respond to the notification message received from the account recovery enrollment module 282 by either confirming or rejecting their role to serve as a trusted referee for the enrolling user. The individuals who confirm their role as a trusted referee for the enrolling user will be added to the database of trusted referee assignments 294, wherein the list of assigned trusted referees for a given user is mapped to the user's profile in the database of registered user profiles 292.

In some embodiments, the account recovery enrollment process can be performed through a self-service portal of the authentication server 200, which allows the user to log into the account recovery system 280 using valid credentials/authenticators that were previously issued to the user, and initiate an account recovery enrollment process through the account recovery enrollment module 282. In other embodiments, the account recovery enrollment process is performed concurrently with an initial registration process in which the user first registers with the authentication server 200 to generate and/or obtain one or more authentication factors for controlled access to a given information system. The user registration/enrollment processes can be performed through, e.g., a mobile application or a web application. In addition, communication with an individual selected as trusted referee to provide notification and obtain confirmation can be performed through a mobile or web application.

The account recovery control module 284 implements methods that are configured to perform an account recovery process which allows a registered user to report a lost authentication factor (e.g., forgotten, misplaced, damaged, stolen, etc.) and to initiate a process to recover access to the user's account as a result of the loss, damage or theft of the user's credentials/authenticators. In some embodiments, the account recovery process allows a registered user to obtain an emergency access token (e.g., temporary access token) which the registered user can utilize to access the user's account for a temporary period of time (e.g., few hours, few days, etc.). In some embodiments, the account recovery process allows a registered user to obtain access to their account for the purpose of enrolling/registering new replacement authentication factors.

The account recovery control module 284 can implement different account recovery protocols to enable account recovery for different use cases which depend on, e.g., the amount and/or types of authentication factors that may be lost (e.g., forgotten, misplaced, damaged, stolen, etc.). For example, FIGS. 3A/3B, 4 and 5 illustrate different account recovery control methods which can be implemented by the account recovery control module 284 to generate a recovery token which registered user can utilize for account recovery in circumstances where the user loses (e.g., forgotten, misplaced, damaged, stolen, etc.) one or all enrolled authentication factors. While the exemplary account recovery control methods described herein provide different flows for different use cases, it is to be noted that each of the account recovery control methods are based on the use of a secret sharing protocol with at least one trusted individual.

Figure 3A:
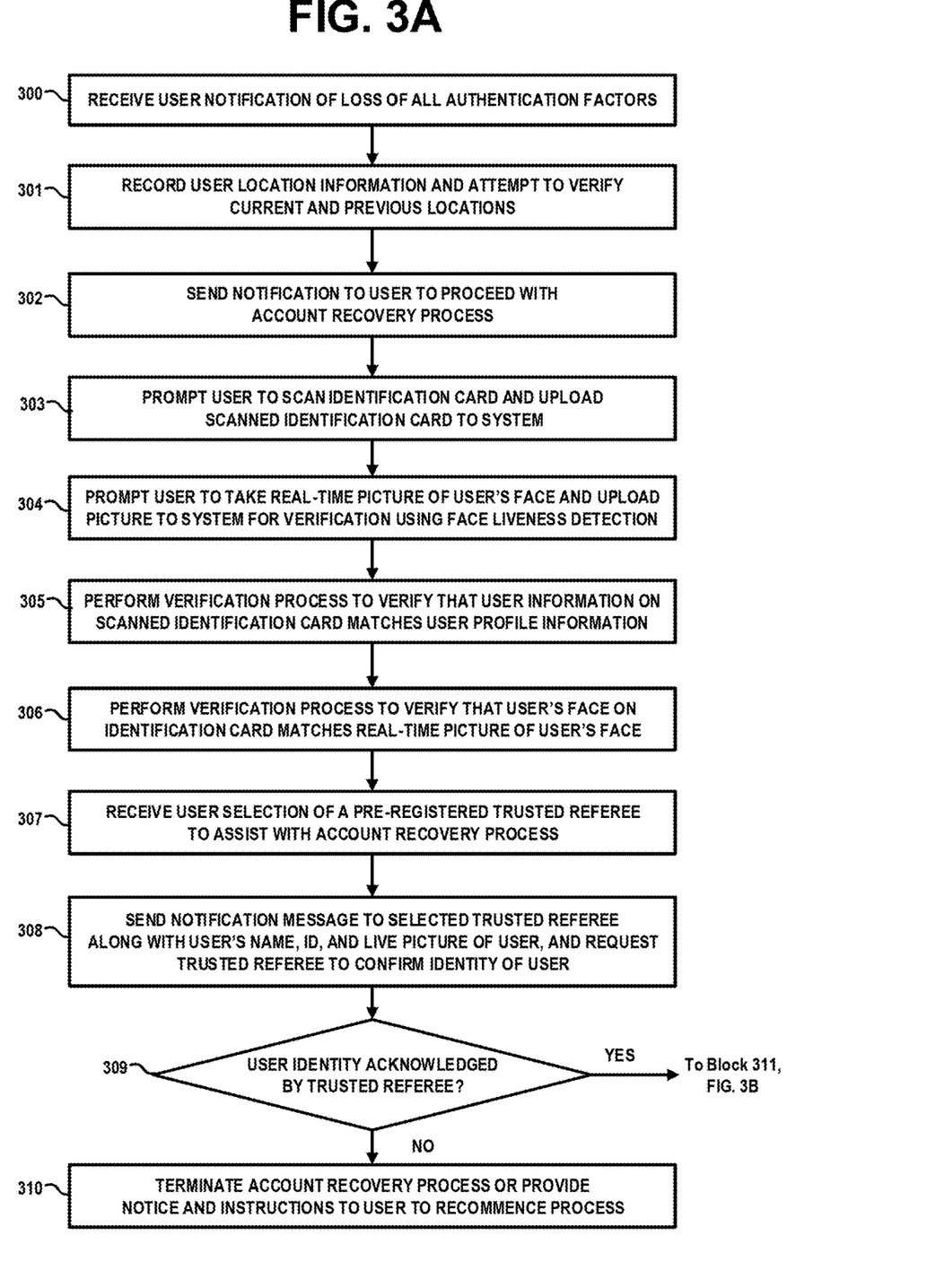
FIGS. 3A and 3B depict a flow diagram of an account recovery control process according to an embodiment of the invention.
Figure 3B:
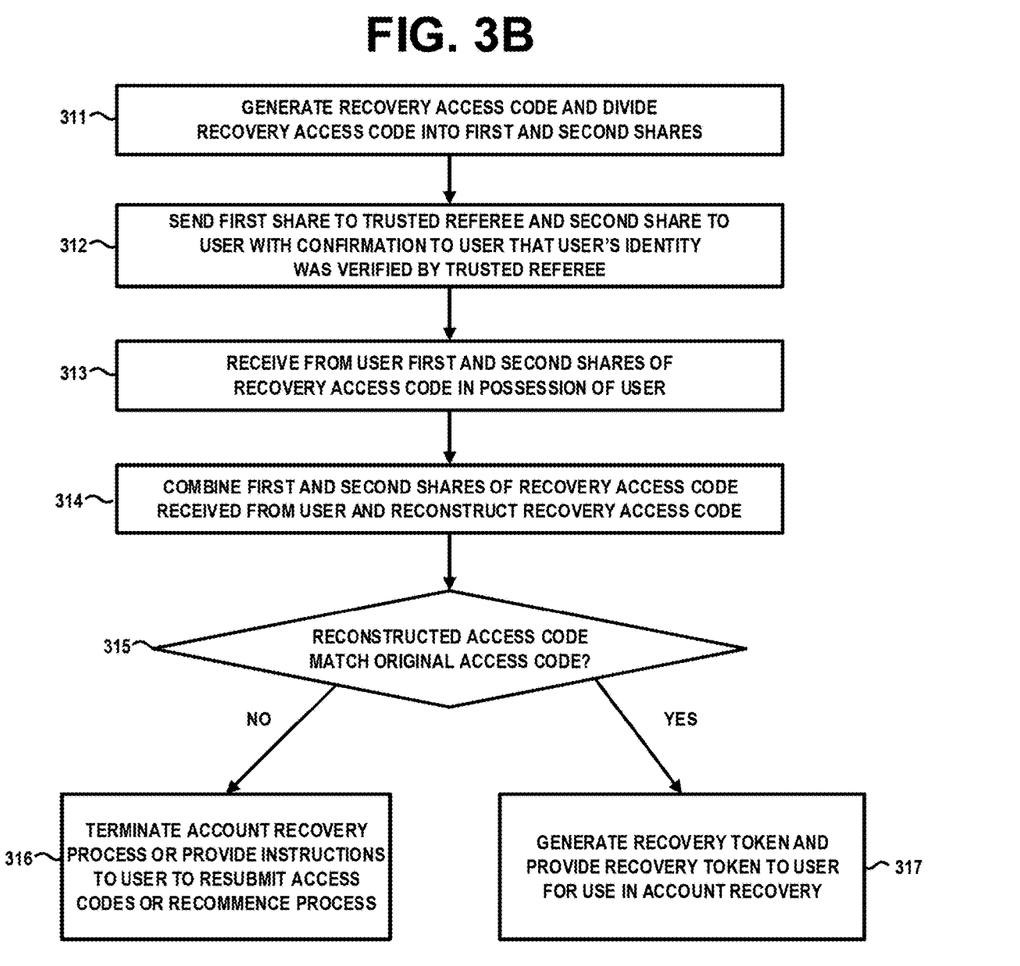

For example, FIGS. 3A and 3B depict a flow diagram of an account recovery control process according to an embodiment of the invention. In particular, FIGS. 3A and 3B illustrate an account recovery control process which is implemented by an account recovery system (e.g., system 144, FIG. 1 or system 280, FIG. 2) to enable recovery or emergency access to an MFA protected account when all authentication factors are lost (e.g., forgotten, misplaced, damaged, stolen, etc.). Referring initially to FIG. 3A, the account recovery system will receive notification from a registered that all authentication factors of the user have been lost (block 300). The system will record the user's current location information and attempt to verify the current and previous locations of the user (block 301). For example, the account recovery system will record the user's current originating IP address and current geolocation using a Wi-Fi-based location tracking system or GPS coordinates and, if possible, verify this current information against external systems that may indicate where and when the user was last located. If the user originated the request from a new location, a new city, a new country, etc., the system may check against travel records to verify if the user is expected to be in the new location.

The process of obtaining and analyzing current and previous location information provides some level of verification on the identity of the registered user. For example, if the system determines that the registered user had recently logged into the access-controlled system within the last hour from a given location, and is now seeking to recover access to his/her account from another location where it not possible for the user to be given the previous location (e.g., different countries), the system can determine that the user seeking to recover access to the access-controlled system is an imposter and engaging in fraudulent activity. In this instance, the system can terminate the account recovery process.

On the other hand, if the user's current location is determined to be valid and not indicative of possible fraudulent activity, the system will proceed with the account recovery process by sending a notification to the user (block 302). For example, in some embodiments, the system sends a notification to a registered phone number or email address of the registered user, or otherwise redirects the user to a new web page in the event that the registered user does not have access to the registered email or phone.

The system prompts the user to scan an identification card and upload the scanned identification card to the account recovery system (block 303). The identification card can be, for example, a government issued identity card (e.g., driver's license, passport, etc.), an employer-issued identity card, etc. In addition, the system prompts the user to take a real-time picture of the user's face and upload the picture to the account recovery system for verification using a liveness detection process (block 304). The account recovery system can implement any suitable liveness detection process to analyze the uploaded picture to ensure that the uploaded picture is actually a genuine live image of the user's face (3D image) and not a picture of a photograph (2D image) of the user's face. The liveness detection process is utilized to differentiate live faces from fake faces (e.g. photographs) by analyzing the uploaded image for 3D structural information using known methods.

The account recovery system verifies the integrity of the data shown in the scanned identification card and verifies that the data shown in the scanned identification card matches the registered user profile information (block 305). In particular, with this verification phase, the account recovery system can analyze features of the scanned identification card to determine if the identification card is authentic (not a fraudulently manufactured identification card) or to otherwise determine indicia of tampering, e.g., intentional change of personal data through scratching, dissolving, cutting, adding foil on top of the imposters identification card with the user's data, etc. if the scanned identification card appears to be authentic, the account recovery system will compare the data in the scanned identification card with the user data contained in the registered user profile data to verify the data matches (e.g., same last name, same birth date, photo ID picture matching user profile image, etc.). In addition, the account recovery system verifies that the picture of on the user's scanned identification card matches the live picture of the user's face that was uploaded to the system (block 306). This verification process is performed using any suitable automated face recognition process to compare faces in two images to determine if the faces are the same or similar.

It is to be understood that in addition to, or in lieu of face recognition, a verification process to verify the identity of the registered user can be implemented using any suitable biometric authentication process. In this regard, the account recovery system can prompt the registered user to provide biometric data (e.g., voice data, fingerprint data, iris data, etc.), and then perform a biometric authentication process to analyze the biometric data provided by the registered user using a biometric model of the registered user to authenticate an identity of the registered user.

If any of the verification operations performed in any of blocks 304, 305 or 306 provide a negative verification result, the account recovery system can terminate the account recovery process or otherwise provide notice of the verification failure and instruct the user on how to continue with the account recovery process (e.g., rescan the same or different identification card, upload a new live image of the user's face, etc.). On the other hand, if the verification operations performed in each of the blocks 304, 305 and 306 provide a positive verification result, the account recovery system will prompt the user to select at least one of the pre-registered trusted referees to assist in the account recovery process.

The account recovery system will receive the user's selection of the pre-registered trusted referee (block 307) and send a notification message to the selected trusted referee regarding the user's initiation of the account recovery process, along with a picture of the user and a request to confirm the identity of the user (block 308). For example, the system will send the notification message and request to a registered e-mail address of the selected trusted referee. In other embodiments, the notification message can be sent via a text message to the registered mobile phone number of the selected trusted referee.

The account recovery system waits to receive an acknowledgment or confirmation from the trusted referee which verifies the identity of the user (block 309). If the trusted referee does not acknowledge or confirm the identity of the user (negative result in block 309), the account recovery system can terminate the account recovery process or otherwise provide notice of the verification failure and instruct the user on how to continue with the account recovery process (block 310). On the other hand, if the account recovery system receives an acknowledgment or confirmation of the user identity from the trusted referee and authorization to issue a recovery access code (affirmative result in block 309), the account recovery system will proceed to generate a recovery access code.

In particular, referring to FIG. 3B, the account recovery system will generate a recovery access code and divide the recovery access code into first and second shares (block 311). For example, in one embodiment, the account recovery system will generate a multi-digit recovery access code and split the multi-digit recovery access code (e.g., 9-digit code) and split the recovery access code into two shares. The account recovery system will send the first share of the recovery access code to the trusted referee and send the second share of the recovery access code to the registered user with confirmation that the trusted referred confirmed the user's identity (block 312). The first and second shares of the recovery access code can be delivered to the trusted referee and registered user, respectively, in one of various forms including, but not limited to, (i) a text message that is displayed on a computing device, (ii) a QR code that can be scanned, (iii) a file for storage, etc.

The registered user and trusted referee then proceed to communicate out-of-band using one of various communication methods including, but not limited to, phone, instant messaging, a peer-to-peer communication application, etc. The out-of-band communications is performed for the trusted referee to provide his/her share of the recovery access code to the registered user. This allows the registered user to have possession of all shares (e.g., first and second shares) of the recovery access code. Once the registered user is in possession of all shares of the recovery access code, the registered user uploads all shares of the recovery access code (which are possessed by the user) to the account recovery system. The registered user can upload the shares of the recovery access code to the account recovery system using a web application or a native application, etc.

Once the account recovery system receives from the registered user all shares (e.g., first and second shares) of the recovery access code possessed by the user (block 313), the account recovery system will combine the shares of the recovery access code to reconstruct the recovery access code (block 314). The account recovery system will compare the reconstructed recovery access code with the original recovery access code to determine if the reconstructed recovery access code matches the original recovery access code (block 315). If it is determined that the reconstructed recovery access code does not match the original recovery access code (negative determination in block 315), the account recovery system can terminate the account recovery process or otherwise provide notice of the process failure and instruct the user to resubmit the shares of access codes possessed by the user or how to continue with the account recovery process (block 316).

On the other hand, if it is determined that the reconstructed recovery access code does match the original recovery access code (affirmative determination in block 315), the account recovery system will generate a recovery token and send the recovery token to the registered user, wherein the recovery toke can be utilized by the registered user for account recovery (block 317). In one embodiment, the recovery token comprises a virtual access card with a QR code, and which comprises information regarding, e.g., the issuance date and expiry date of the recovery token. The registered user can store the virtual access card into a digital wallet such as the Apple wallet and use it for account recovery. For example, in one embodiment, the recovery token comprises an emergency access token that allows temporary access to the user's account for a pre-determined period of time, and which gives the user the ability to access and use the account, and generate new authentication factors in due course before the expiration period. In another embodiment, the recovery token allows the user to access his/her account for the purpose of generating new authentication factor(s) (to replace the lost authentication factor(s)) and binding the new authentication factors to the registered user account.

The account recovery control process of FIGS. 3A and 3B provides a secure protocol for account recovery which prevents a trusted referee or other individual from impersonating a registered user to fraudulently gain access to the user's account. For example, a third person or trusted referee would need access to the user's valid identification card (e.g., government-issued ID) or be able to defeat the ID proofing system by defeating, e.g., the face or voice recognition process to impersonate the legitimate user. In addition, the third person attempting to impersonate a registered user would need access to one of the user's phone, email address, or social accounts to communicate with a trusted referee.

In addition, to prevent the trusted referee from impersonating the user and obtaining all shares of the recovery access code, one or more additional trusted referees can be added to the account recovery control process. In this instance, the recovery access code would be divided into y+1 shares, where y≥2 represents the number of different trusted referees who obtain a share of the recovery access code, making it difficult for the fraudulent referee to obtain the other portion(s) of the access code from the other trusted referee(s).

Figure 4:
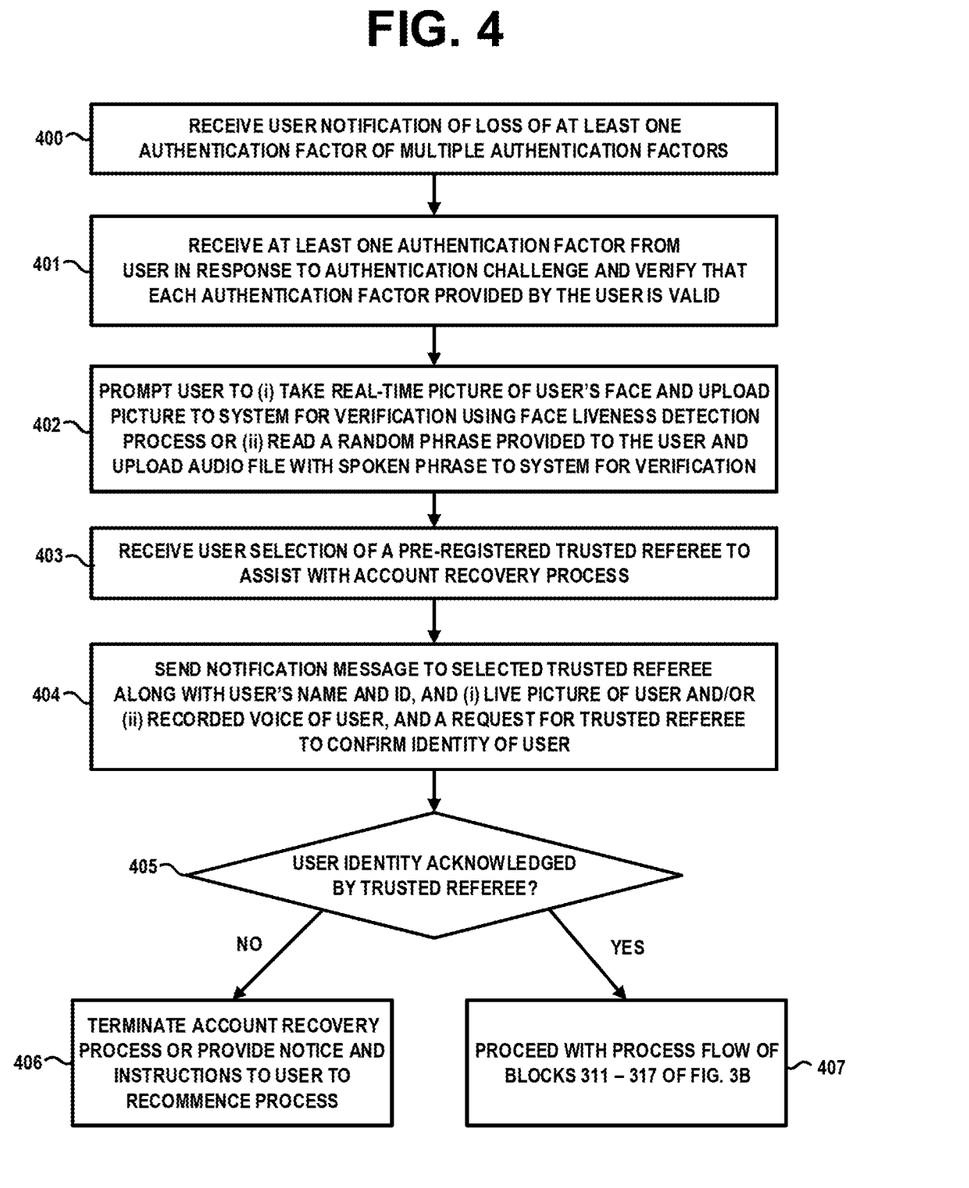
FIG. 4 depicts a flow diagram of an account recovery control process according to another embodiment of the invention.

FIG. 4 depicts a flow diagram of an account recovery control process according to another embodiment of the invention. In particular, FIG. 4 illustrates an account recovery control process which is implemented by an account recovery system (e.g., system 144, FIG. 1 or system 280, FIG. 2) to enable access to an MFA protected account when one authentication factor of a plurality of authentication factors is lost (e.g., forgotten, misplaced, damaged, stolen, etc.). Referring to FIG. 4, the account recovery system will receive notification from a registered user that at least one authentication factor of multiple authentication factors has been lost (block 400). For example, the registered user may have lost a password, SecurID Token, FIDO security key, etc. The account recovery system will prompt the registered user to provide one or more registered authentication factors of the user which remain in the possession or knowledge of the registered user. The account recovery system will receive the one or more authentication factors from the user and verify that each authentication factor provided by the user is valid by matching/comparing the received authentication factor to the user' registered authentication factors as maintained in the authentication database 290 (FIG. 2) (block 401).

The account recovery system prompts the user to (i) take a real-time picture of the user's face and upload the picture to the account recovery system for verification using a liveness detection process and/or (ii) read a random phrase provided to the user and upload an audio file of the spoke phrase to the account recovery system for verification using a speaker recognition and verification process (block 402). As noted above, the account recovery system can implement any suitable liveness detection process to analyze the uploaded picture to ensure that the uploaded picture is actually a genuine live image of the user's face (3D image) and not a picture of a photograph (2D image) of the user's face. In addition, the account recovery system can implement a suitable speaker identification and verification process to analyze the audio file (containing spoken random phrase) against a speech template or speech model of the user, and attempt to identify and verify the identity of the registered user based on the voice characteristics in the audio file.

If any of the verification operations performed in any of blocks 401 and 402 provide a negative verification result, the account recovery system can terminate the account recovery process or otherwise provide notice of the verification failure and instruct the user on how to continue with the account recovery process (e.g., resubmit an authentication factor, upload a new live image of the user's face, upload a new voice file, etc.). On the other hand, if the verification operations performed in each of the blocks 401 and 402 provide a positive verification result, the account recovery system will prompt the user to select at least one of the pre-registered trusted referees to assist in the account recovery process.

The account recovery system will receive the user's selection of the pre-registered trusted referee (block 403) and send a notification message to the selected trusted referee regarding the user's initiation of the account recovery process, along with the user's name and ID, and the (i) live picture of the user and/or (ii) the recorded voice of the user, as well as a request for the trusted referee to confirm the identity of the user based on the information provided by the account recovery system (block 404). For example, the system will send the notification message to a registered e-mail address of the selected trusted referee. In other embodiments, the notification message can be sent via a text message to the registered mobile phone number of the selected trusted referee.

The account recovery system waits to receive an acknowledgment or confirmation from the trusted referee which verifies the identity of the user (block 405). If the trusted referee does not acknowledge or confirm the identity of the user (negative result in block 405), the account recovery system can terminate the account recovery process or otherwise provide notice of the verification failure and instruct the user on how to continue with the account recovery process (block 406). On the other hand, if the account recovery system receives an acknowledgment or confirmation of the user identity from the trusted referee and authorization to issue a recovery access code (affirmative result in block 405), the account recovery system will proceed with the process flow of blocks 311, 312, 313, 314, 315, 316, and 317 of FIG. 3B (block 407) as discussed above, the details of which will not be repeated.

The account recovery control process of FIG. 4 provides a secure protocol for account recovery which prevents a trusted referee or other individual from impersonating a registered user to fraudulently gain access to the user's account. For example, a third person or trusted referee would need access to one or more of the user's registered authentication factors to commence the account recovery process. In addition, the third person or trusted referee would need to defeat the ID proofing system by defeating, e.g., the face or voice recognition process to impersonate the legitimate user. In addition, the third person attempting to impersonate a registered user would need access to one of the user's phone, email address, or social accounts to communicate with a trusted referee. In addition, to prevent the trusted referee from impersonating the user and obtaining all shares of the recovery access code, one or more additional trusted referees can be added to the account recovery control process, providing an added level of security for reasons as discussed above.

Figure 5:
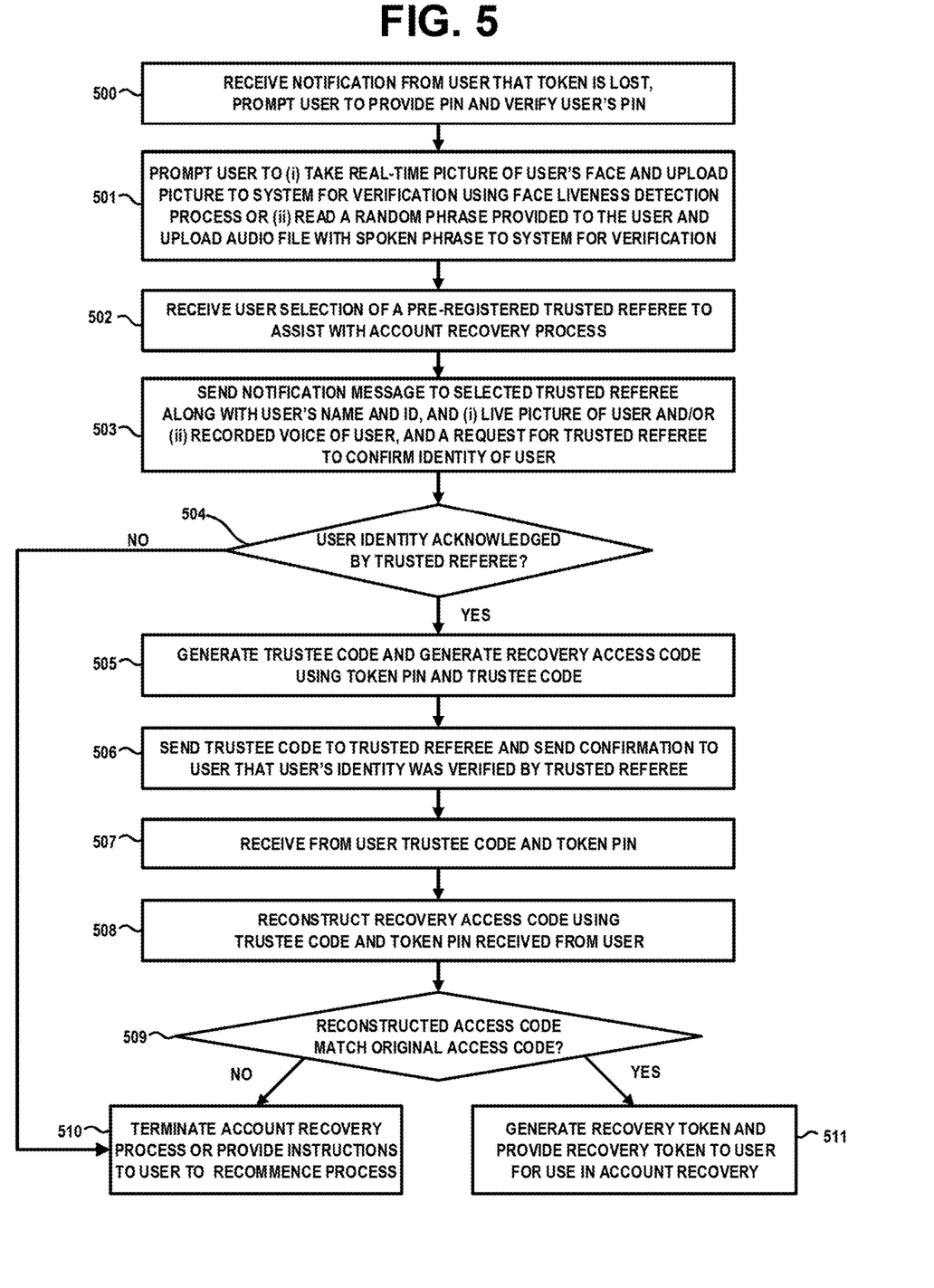
FIG. 5 depicts a flow diagram of an account recovery control process according to another embodiment of the invention.

FIG. 5 depicts a flow diagram of an account recovery control process according to another embodiment of the invention. In particular, FIG. 5 illustrates an account recovery control process which is implemented by an account recovery system (e.g., system 144, FIG. 1 or system 280, FIG. 2) to enable access to a protected account when, for example, a PIN-based SecurID token is lost (e.g., misplaced, damaged, stolen, etc.). As is known in the art, a SecurID token comprises one of many forms including, but not limited to: (i) a software token; (ii) an application program executing on a workstation, installed on a smartcard, or running as a plug-in to a Web browser; or (iii) or hand-held microprocessor-controlled device (e.g., a key fob or standard card). A SecurID token is assigned to a user and creates an authentication code (e.g., tokencode) at fixed intervals (typically every 60 seconds) using a built-in clock and a pre-encoded random key or seed. The seed is different for each SecurID token, and is loaded into a corresponding RSA SecurID server (e.g., RSA Authentication Manager) as tokens are purchased/issued.

To gain access to a protected system, a user will enter a valid SecurID passcode which is comprised of (i) a PIN of the user and (ii) a current tokencode generated (and displayed) by the RSA SecurID token. For example, an application may display a window into which a user enters a PIN, and the software token computes the passcode. With a hand-held RSA SecurID token device, the token device can have a PIN pad which allows a user to enter the user's PIN into the token device to enable the token device to generate a passcode. When the token device has no PIN pad, the passcode is created by concatenating the user's PIN and a tokencode displayed by the token device. A tokencode is a changing number displayed on the key fob. The tokencode is a number generated by the RSA SecurID authenticator at one-minute intervals. A user then enters the PIN and tokencode to authenticate to an authentication server.

A user can authenticate using an RSA SecurID device in response to being prompted for a passcode by entering the user's PIN followed by a current tokencode that is currently displayed on the RSA SecurID device. In this instance, the passcode comprises a concatenation of the PIN and the tokencode. When an RSA SecurID token comprises a PIN pad, a user can authenticate using the RSA SecurID PIN pad by entering the user PIN into the PIN pad, and pressing button to generate and present a new passcode on the token. The user can then enter the newly generated passcode in response to being prompted by an authentication server. The user can then proceed to erase the PIN from the token device memory.

In the exemplary process of FIG. 5, a user connects to a self-service portal of the authentication server (e.g., account recovery system) and reports loss of the user's token and, in response, the account recovery system prompts the user to provide the user's token PIN, and the system verifies the PIN (block 500). In one exemplary embodiment, the authentication server verifies the user's PIN against a stored hash value in the authentication database. In particular, the authentication server will apply a cryptographic hash function to the user's PIN to generate a hash value, and then compare the generated hash value to a stored hash value of the known, registered PIN.

The account recovery system prompts the user to (i) take a real-time picture of the user's face and upload the picture to the account recovery system for verification using a liveness detection process and/or (ii) read a random phrase provided to the user and upload an audio file of the spoke phrase to the account recovery system for verification using a speaker recognition and verification process (block 501). As noted above, the account recovery system can implement any suitable liveness detection process to analyze the uploaded picture to ensure that the uploaded picture is actually a genuine live image of the user's face (3D image) and not a picture of a photograph (2D image) of the user's face. In addition, the account recovery system can implement a suitable speaker identification and verification process to analyze the audio file (containing spoken random phrase) against a speech template or speech model of the user, and attempt to identify and verify the identity of the registered user based on the voice characteristics in the audio file.

If any of the verification operations performed in any of blocks 500 and 501 provide a negative verification result, the account recovery system can terminate the account recovery process or otherwise provide notice of the verification failure and instruct the user on how to continue with the account recovery process (e.g., resubmit user's token PIN, upload a new live image of the user's face, upload a new voice file, etc.). On the other hand, if the verification operations performed in each of the blocks 500 and 501 provide a positive verification result, the account recovery system will prompt the user to select at least one of the pre-registered trusted referees to assist in the account recovery process.

The account recovery system will receive the user's selection of the pre-registered trusted referee (block 502) and send a notification message to the selected trusted referee regarding the user's initiation of the account recovery process, along with the user's name and ID, and the (i) live picture of the user and/or (ii) the recorded voice of the user, as well as a request for the trusted referring to confirm the identity of the user based on the information provided by the account recovery system (block 503). For example, the system will send the notification message to a registered e-mail address of the selected trusted referee. In other embodiments, the notification message can be sent via a text message to the registered mobile phone number of the selected trusted referee.

The account recovery system waits to receive an acknowledgment or confirmation from the trusted referee which verifies the identity of the user (block 504). If the trusted referee does not acknowledge or confirm the identity of the user (negative result in block 504), the account recovery system can terminate the account recovery process or otherwise provide notice of the verification failure and instruct the user on how to continue with the account recovery process (block 510).

On the other hand, if the account recovery system receives an acknowledgment or confirmation of the user identity from the trusted referee and authorization to issue a recovery access code (affirmative result in block 504), the account recovery system will proceed to generate a random code (referred to herein as "trustee code") and generate a recovery access code using the trustee code and the token PIN (block 505). For example, in one embodiment, the account recovery system will generate a multi-digit recovery access code (e.g., 9-digit code) as follows: recovery access code=(token PIN) XOR (trustee code).

The account recovery system will send the trustee code to the trusted referee and send a confirmation to the user that the trusted referee confirmed the user's identity (block 506). The trustee code can be delivered to the trusted referee in one of various forms including, but not limited to, (i) a text message that is displayed on a computing device, (ii) a QR code that can be scanned, (iii) a file for storage, etc., and the notification to the user can be deliver by text, e-mail, etc.

The registered user and trusted referee then proceed to communicate out-of-band using one of various communication methods including, but not limited to, phone, instant messaging, a peer-to-peer communication application, etc. The out-of-band communication is performed for the trusted referee to provide the trusted code to the registered user. This allows the registered user to have possession of both the trustee code and the token PIN, which were used to generate the recovery access code. Once the registered user is in possession of the trustee code, the registered user provides the trustee code and the token PIN to the account recovery system. The registered user can provide the trustee code and the token PIN to the account recovery system using a web application or a native application, etc.

Once the account recovery system receives the trustee code and token PIN from the registered user (block 507), the account recovery system will reconstruct the recovery access code using the trustee code and token PIN received from the user by computing recovery access code (reconstructed)=PIN XOR trustee code (block 508). The account recovery system will compare the reconstructed recovery access code with the original recovery access code to determine if the reconstructed recovery access code matches the original recovery access code (block 509). If it is determined that the reconstructed recovery access code does not match the original recovery access code (negative determination in block 509), the account recovery system can terminate the account recovery process or otherwise provide notice of the process failure and instruct the user to resubmit the trustee code and/or token PIN possessed by the user or how to continue with the account recovery process (block 510).

On the other hand, if it is determined that the reconstructed recovery access code does match the original recovery access code (affirmative determination in block 509), the account recovery system will generate a recovery token and send the recovery token to the registered user, wherein the recovery token can be utilized by the registered user for account recovery (block 511). In one embodiment, the recovery token comprises the verified recovery access code (e.g., 9-digit code) which serves as a tokencode for a SecurID token, which can be appended to the user's toke PIN to gain access to the account. In one embodiment, the recovery token is embodied in the form of a virtual access card with a QR code, which comprises information regarding, e.g., the issuance date and expiry date of the recovery token. The registered user can store the virtual access card in a digital wallet such as the Apple wallet and use it for account recovery. For example, in one embodiment, the recovery token comprises an emergency access token that allows temporary access to the user's account for a predetermined period of time, and which gives the user the ability to access and use the account, and generate new authentication factors in due course before the expiration period. In another embodiment, the recovery token allows the user to access his/her account for the purpose of replacing the lost or damaged SecurID token with a new SecurID token and binding the new SecurID token to the registered user account.

The account recovery control process of FIG. 5 provides a secure protocol for account recovery which prevents a trusted referee or other individual from impersonating a registered user to fraudulently gain access to the user's account. For example, a third person or trusted referee would need to know the registered user's Token PIN to commence the account recovery process. In addition, the third person or trusted referee would need to defeat the ID proofing system by defeating, e.g., the face or voice recognition process to impersonate the legitimate user. In addition, the third person attempting to impersonate a registered user would need access to one of the user's phone, email address, or social accounts to communicate with a trusted referee. In addition, to prevent the trusted referee from impersonating the user and obtaining access to the user's account by possessing the PIN and trustee code, one or more additional trusted referees can be added to the account recovery control process with additional trustee codes needed to generate the recovery access, providing an added level of security for reasons as discussed above.

It is to be appreciated the account recovery control techniques described herein for different use cases can be tailored based on risk factors to achieve a desired assurance level without making the account recovery process unduly burdensome to the registered user. For example, in some circumstances and environments, it may be sufficient to simply prompt the user for a PIN without having to perform the face recognition (e.g., liveness detection) and/or speaker identification (e.g., voice recognition) procedures as discussed above.

The techniques discussed herein can be applied in other use cases such as account creation and credential binding (e.g., enroll in MFA system by registering new authentication factors and binding the new authentication factors to an existing account). In addition, the techniques described herein can be utilized for exchanging access codes for scope OAuth tokens or JSON web tokens (JWT) tokens, etc.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
performing, by an authentication server, an account recovery process in response to receiving notification from a first registered user of a loss of at least one authentication factor which is utilized by the first registered user to access an information system, wherein the authentication server is configured to control access to the information system by a plurality of registered users of the information system, the account recovery process comprising:
performing a verification process to verify an identity of the first registered user;
prompting the first registered user to select a second registered user of the information system as a trusted referee to assist in the account recovery process;
notifying the selected trusted referee of the account recovery process and providing identifying information of the first registered user to the selected trusted referee;
receiving, from the selected trusted referee, confirmation of the identity of the first registered user;
responsive to receiving confirmation from the selected trusted referee, generating an original recovery access code comprising at least a first component and a second component, and sending the second component of the original recovery access code to the selected trusted referee;
receiving, from the first registered user, the first and second components of the original recovery access code, and reconstructing a recovery access code using the first and second components received from the first registered user; and
responsive to the reconstructed recovery access code matching the original recovery access code, generating and sending a recovery token to the first registered user for use in recovering a registered account of the first registered user for access to the information system.

2. The method of claim 1, wherein the first registered user selects the trusted referee from a pre-defined group of one or more trusted referees who are registered users of the information system and who are pre-assigned to assist in the account recovery process for the first registered user.

3. The method of claim 1, wherein the original recovery access code comprises a multi-digit recovery access code and wherein the first and second components of the original recovery access code are generated by dividing the multi-digit recovery access code into a plurality of components comprising the first component and the second component.

4. The method of claim 3, further comprising sending the first component of the multi-digit recovery access code to the first registered user.

5. The method of claim 1, wherein the original recovery access code comprises a multi-digit recovery access code, wherein the first component comprises a token PIN (personal identification number) of the first registered user and wherein the second component comprises a randomly generated code.

6. The method of claim 5, wherein the original recovery access code is generated by applying an exclusive-OR operation on the token PIN and the randomly generated code.

7. The method of claim 6, wherein reconstructing the recovery access code using the first and second components received from the first registered user comprises applying an exclusive-OR operation on the token PIN and the randomly generated code received from the first registered user.

8. The method of claim 1, wherein performing the verification process to verify the identity of the first registered user comprises:
prompting the first registered user to provide a token PIN (personal identification number); and
verifying that the token PIN provided by the first registered user matches a registered token PIN of the first registered user.

9. The method of claim 1, wherein performing the verification process to verify the identity of the first registered user comprises:
prompting the first registered user to provide biometric data; and
performing a biometric authentication process to analyze the biometric data provided by the first registered user using a biometric model of the first registered user to authenticate an identity of the first registered user.

10. The method of claim 9, wherein the biometric data comprises a recorded voice of the first registered user which is generated by the first registered user uttering a random phrase as prompted by the authentication server.

11. The method of claim 1, wherein performing the verification process to verify the identity of the first registered user comprises:
prompting the first registered user to provide a real-time picture of the first registered user; and
performing a liveness detection process to verify that an image provided by the first registered user comprises a live image of the user's face.

12. The method of claim 1, wherein the recovery token comprises an emergency access token that allows temporary access to the registered account of the first registered user for a pre-determined period of time to access the information system.

13. The method of claim 1, wherein the recovery token allows the first registered user to access the registered user account to generate one or more new authentication factors and bind the one or more new authentication factors to the registered user account.

14. An article of manufacture comprising a non-transitory processor-readable storage medium having stored therein program code of one or more software programs, wherein the program code is executable by one or more processors to perform a method which comprises:
performing, by an authentication server, an account recovery process in response to receiving notification from a first registered user of a loss of at least one authentication factor which is utilized by the first registered user to access an information system, wherein the authentication server is configured to control access to the information system by a plurality of registered users of the information system, the account recovery process comprising:
performing a verification process to verify an identity of the first registered user;
prompting the first registered user to select a second registered user of the information system as a trusted referee to assist in the account recovery process;
notifying the selected trusted referee of the account recovery process and providing identifying information of the first registered user to the selected trusted referee;
receiving, from the selected trusted referee, confirmation of the identity of the first registered user;
responsive to receiving confirmation from the selected trusted referee, generating an original recovery access code comprising at least a first component and a second component, and sending the second component of the recovery access code to the selected trusted referee;
receiving, from the first registered user, the first and second components of the original recovery access code, and reconstructing a recovery access code using the first and second components received from the first registered user; and
responsive to the reconstructed recovery access code matching the original recovery access code, generating and sending a recovery token to the first registered user for use in recovering a registered account of the first registered user for access to the information system.

15. The article of manufacture of claim 14, wherein the original recovery access code comprises a multi-digit recovery access code, wherein the first and second components of the original recovery access code are generated by dividing the multi-digit recovery access code into a plurality of components comprising the first component and the second component, and further comprising ending the first component of the multi-digit recovery access code to the first registered user.

16. The article of manufacture of claim 14, wherein the original recovery access code comprises a multi-digit recovery access code, wherein the first component comprises a token PIN (personal identification number) of the first registered user, wherein the second component comprises a randomly generated code, wherein the original recovery access code is generated by applying an exclusive-OR operation on the token PIN and the randomly generated code; and
wherein reconstructing the recovery access code using the first and second components received from the first registered user comprises applying an exclusive-OR operation on the token PIN and the randomly generated code received from the first registered user.

17. The article of manufacture of claim 14, wherein performing the verification process to verify the identity of the first registered user comprises:
prompting the first registered user to provide a token PIN (personal identification number); and
verifying that the token PIN provided by the first registered user matches a registered token PIN of the first registered user.

18. The article of manufacture of claim 14, wherein performing the verification process to verify the identity of the first registered user comprises:
- prompting the first registered user to provide biometric data; and
- performing a biometric authentication process to analyze the biometric data provided by the first registered user using a biometric model of the first registered user to authenticate an identity of the first registered user.

19. A system, comprising:
- a network of application servers that implement an information system; and
- an authentication sever configured to authenticate registered users of the information system requesting access the network of application servers, wherein the authentication server comprises memory to store software instructions and one or more processors to execute the software instructions to perform a method which comprises:
- performing, by the authentication server, an account recovery process in response to receiving notification from a first registered user of a loss of at least one authentication factor which is utilized by the first registered user to access an information system, the account recovery process comprising:
- performing a verification process to verify an identity of the first registered user;
- prompting the first registered user to select a second registered user of the information system as a trusted referee to assist in the account recovery process;
- notifying the selected trusted referee of the account recovery process and providing identifying information of the first registered user to the selected trusted referee;
- receiving, from the selected trusted referee, confirmation of the identity of the first registered user;
- responsive to receiving confirmation from the selected trusted referee, generating an original recovery access code comprising at least a first component and a second component, and sending the second component of the recovery access code to the selected trusted referee;
- receiving, from the first registered user, the first and second components of the original recovery access code, and reconstructing a recovery access code using the first and second components received from the first registered user; and
- responsive to the reconstructed recovery access code matching the original recovery access code, generating and sending a recovery token to the first registered user for use in recovering a registered account of the first registered user for access to the information system.

20. The system of claim 19, wherein the original recovery access code comprises a multi-digit recovery access code, and wherein one of:
(i) the first and second components of the original recovery access code are generated by dividing the multi-digit recovery access code into a plurality of components comprising the first component and the second component, and further comprising ending the first component of the multi-digit recovery access code to the first registered user, and
(ii) the first component comprises a token PIN (personal identification number) of the first registered user, wherein the second component comprises a randomly generated code, wherein the original recovery access code is generated by an applying an exclusive-OR operation on the token PIN and the randomly generated code, wherein reconstructing the recovery access code using the first and second components received from the first registered user comprises applying an exclusive-OR operation on the token PIN and the randomly generated code received from the first registered user.

* * * * *